J. C. SELLERS.
Fly-Trap.

No. 160,034.                    Patented Feb. 23, 1875.

WITNESSES:

INVENTOR:
Jacob C. Sellers
per
C. H. Watrous & Co.
ATTORNEYS.

THE GRAPHIC CO.PHOTO-LITH.39 & 41 PARK PLACE,N.Y.

UNITED STATES PATENT OFFICE.

JACOB C. SELLERS, OF MARSHFIELD, MISSOURI.

IMPROVEMENT IN FLY-TRAPS.

Specification forming part of Letters Patent No. 160,034, dated February 23, 1875; application filed January 23, 1875.

*To all whom it may concern:*

Be it known that I, JACOB C. SELLERS, of Marshfield, in the county of Webster and State of Missouri, have invented certain new and useful Improvements in Fly-Trap; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction and arrangement of a fly-trap, as will be hereinafter more fully set forth.

Figure 1:
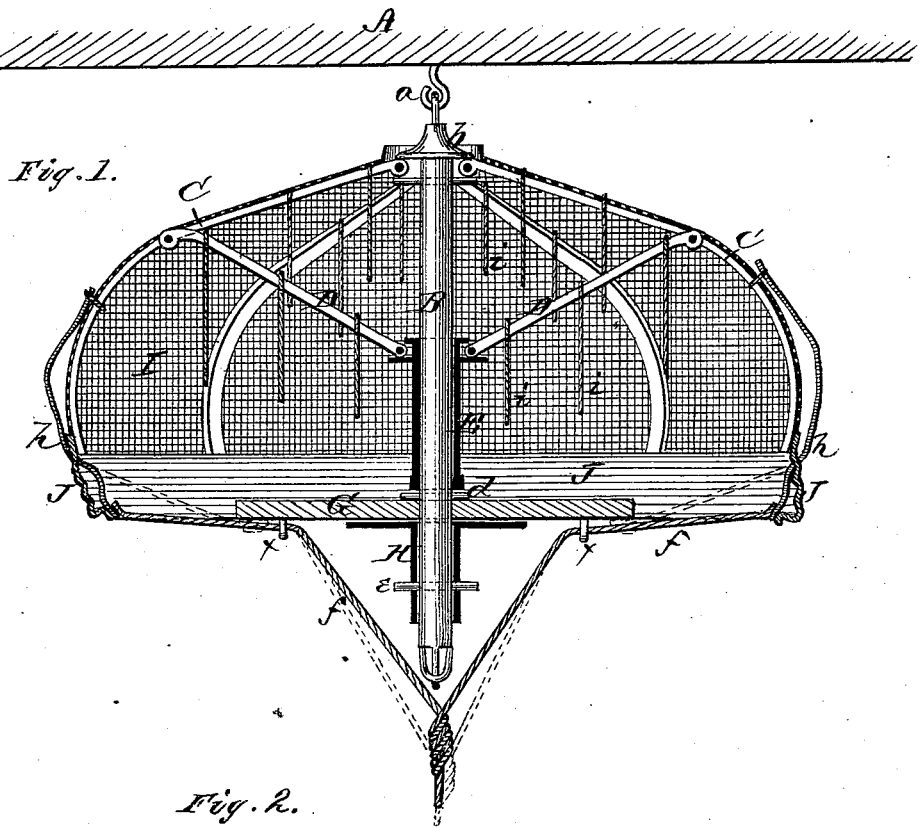
Figure 2:
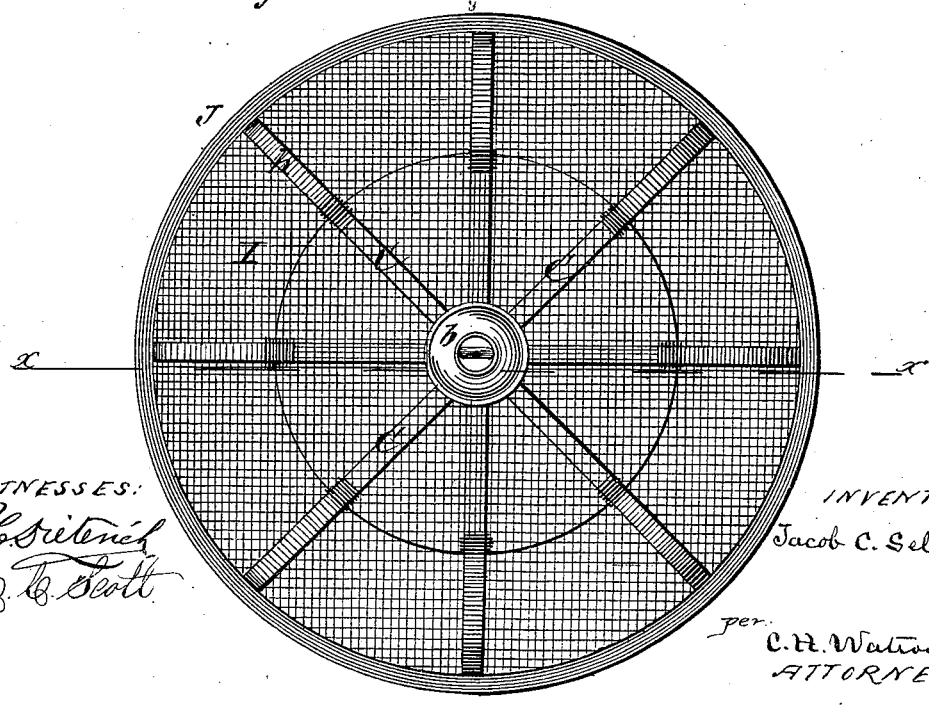

In the annexed drawing, Figure 1 is a longitudinal section of my fly-trap, and Fig. 2 is a plan view of the same.

A represents the ceiling of a room, from which my fly-trap is to be suspended. From a hook, $a$, in the ceiling is suspended a staff or rod, B, having a series of curved ribs, C C, hinged to a collar, $b$, at or near its upper end, said ribs being spread by means of rods D D, operated by means of a sliding sleeve or collar, E, on the staff B, in the same manner as an ordinary umbrella. The sleeve or collar E is held in place on the staff B by a pin, $d$, and under the same on the staff is placed a circular bait-board, G, supported by means of a flanged sleeve, H, held on the staff by a pin, $e$. On the ribs C C is secured a net or netting, I, the meshes of which are of such size as will prevent flies from passing through. To the lower ends of the ribs C C is secured an apron, J, which is held up, as shown in Fig. 1, by elastic bands $h$ $h$; and strings or cords $ff$ are fastened to the lower edge of the apron at suitable intervals, and passed through staples $x$ on the under side of the bait-board G, after which all the strings or cords are united into one. From the ribs C and rods D depend a number of strings, $i$, which are to be baited.

The strings $i$ are baited, and bait also placed on the board G, to entice the flies into the trap, the strings serving as roosting-places for the flies. The trap is then suspended from the ceiling, when the flies will pass in underneath to feed or sleep. By now seizing the draw-strings $f$ and giving a quick pull the apron J is made to close the space between the edge of the net I and the bait-board G, when the trap is taken down and the flies killed by hot water, or otherwise, as desired.

Having thus fully described my invention, what I claim as new, and desire to secure by Letters Patent, is—

1. A fly-trap consisting of an umbrella-shaped frame covered with netting, and an adjustable apron attached around the same to the ends of the ribs, as herein set forth.

2. The combination, with an umbrella-shaped frame covered with netting, of the apron J, elastic springs or bands $h$, draw-strings $f$, and bait-board G, substantially as and for the purposes herein set forth.

In testimony that I claim the foregoing as my own I affix my signature in presence of two witnesses.

JACOB CREATH SELLERS.

Witnesses:
W. H. DALTON,
A. McALLANNY.